United States Patent [19]
Arant

[11] 3,907,444
[45] Sept. 23, 1975

[54] PIVOT JOINT HAVING AT LEAST FOUR DEGREES OF FREEDOM

[76] Inventor: Gene W. Arant, 2444 Jupiter Dr., Los Angeles, Calif. 90046

[22] Filed: Sept. 24, 1973

[21] Appl. No.: 399,808

Related U.S. Application Data

[62] Division of Ser. No. 324,957, Jan. 19, 1973, Pat. No. 3,854,208.

[52] U.S. Cl. ............................... 403/77; 403/122
[51] Int. Cl. ............................................. F16c 11/00
[58] Field of Search ......... 403/115, 56, 77, 76, 122, 403/144, 137; 32/19

[56] References Cited
UNITED STATES PATENTS

| | | | |
|---|---|---|---|
| 1,474,854 | 11/1923 | Spire | 403/56 X |
| 2,670,228 | 2/1954 | Pagliuso | 403/137 |
| 3,147,025 | 9/1964 | Good | 403/143 X |

*Primary Examiner*—Andrew V. Kundrat

[57] ABSTRACT

A pivot joint having at least four degrees of freedom, which includes a tubular member having a longitudinal slot formed in its wall, a sphere disposed inside the tubular member in both slidable and rotatable engagement with its inner wall surface, and a post having one end which is narrower than the slot and which extends through the slot and is secured to the sphere.

4 Claims, 4 Drawing Figures

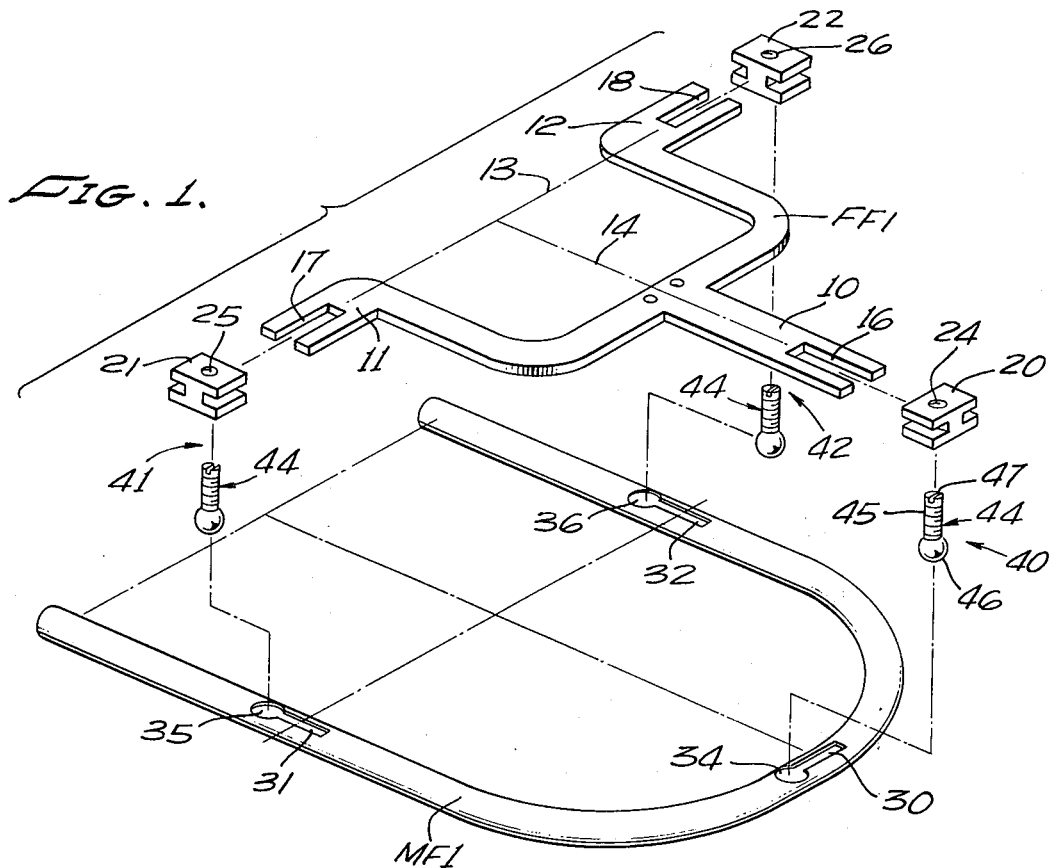
Fig. 1.
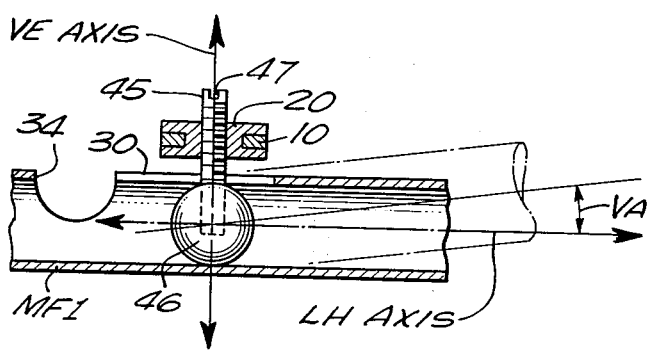
Fig. 2.
Fig. 3.
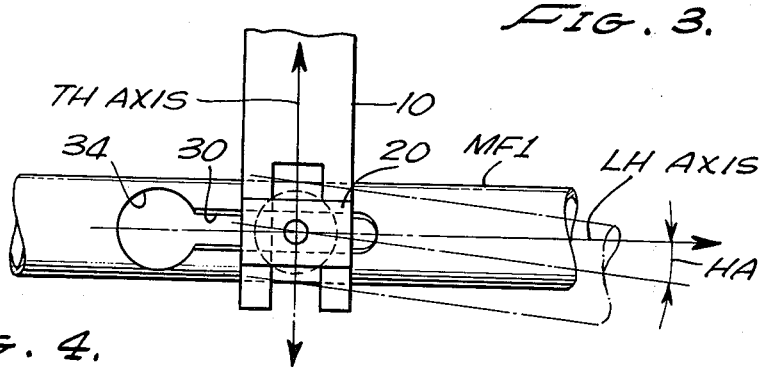
Fig. 4.

PIVOT JOINT HAVING AT LEAST FOUR DEGREES OF FREEDOM

RELATED APPLICATION

The present application is a division of my prior copending application Ser. No. 324,957, filed Jan. 19, 1973, and entitled "DENTAL FACE BOW ASSEMBLY" now U.S. Pat. No. 3,854,208.

BACKGROUND OF THE INVENTION

To adjust both the position and the aspect of a body in space requires six different degrees of adjustability. A requirement for such mechanisms exist in highly sophisticated equipment such as space vehicles and the like. Such a requirement also exists in the field of dentistry.

In dental work a transfer face bow is used for positioning dental casts in an articulator. The transfer face bow is used in acquiring position reference information from the face of the patient. It is desirable to utilize a transfer face bow which is capable of complete adjustment both as to position and aspect.

In my prior copending application Ser. No. 324,957 of which this application is a division, there is disclosed a dental face bow assembly in which a dental face bow is supported from three separate pivot joints. Each pivot joint is capable of providing at least 4 and preferably 6° of adjustability. The present drawings are identical to those of the prior copending application and hence disclose not only the pivot joint construction but the dental face bow assembly as well. Applicable prior art includes U.S. Pat. Nos.: Wilt, 1,117,123 Groves, 1,608,276 Wharam, 2,448,851 Pagliuso, 2,670,228 Korecky, 3,423,115

SUMMARY OF THE INVENTION

A pivot joint having four degrees of adjustability, or freedom of movement is constructed by utilizing only three elements — a tube, a sphere, and a post. The sphere is of such size as to fit within the tube so that it may either rotate or slide, or both, within the interior wall of the tube. An elongated slot is formed in one wall of the tube, which in general extends longitudinally of the tube although it need not necessarily be precisely parallel to the longitudinal axis of the tube. The post has one end protruding through the slot in the tube and fixedly secured to the sphere. The slot is wider than the end of the post, hence permitting rotation of the sphere relative to the longitudinal axis of the tube.

In order to provide additional degrees of adjustability, or freedom of movement, additional mechanism is used in conjunction with the other end of the post. The other end of the post may be threaded and inserted in a nut, and there are then five degrees of adjustability of the nut relative to the tube. The nut may in turn be fitted into a slideway of another member, which other member then possesses 6° of adjustability relative to the tube.

DRAWING SUMMARY

FIG. 1 is an exploded perspective view of an adjustable mechanism which illustrates some of the mechanical principles of the present invention;

FIG. 2 is an enlarged fragmentary cross-sectional view of one of the pivot joints of FIG. 1, taken along the longitudinal axis of the tubular member;

FIG. 3 is an enlarged fragmentary cross-sectional view of the same pivot joint but taken transverse to the tubular member;

FIG. 4 is a top plan view of the pivot joint of FIGS. 2 and 3;

THE ADJUSTABLE MECHANISM OF FIGS. 1–4, INCLUSIVE

A rigid fixed frame FF1 is formed from a single flat piece of material having a forward arm 10 and lateral arms 11 and 12, respectively. The lateral arms have a common axis 13 while the forward arm has an axis 14 which is perpendicular thereto. The arm ends are slotted on their respective axes to form respective slideways 16, 17, 18.

A rigid generally U-shaped movable frame MF1 is formed from a single tubular member. In its upper wall it has elongated slots 30, 31, and 32 which are formed in the central portion and the two side portions, respectively. A round hole 34 is formed at the end of slot 30, and similar holes 35, 36 are formed at the ends of the slots 31, 32.

A set of three adjustable support means, or pivot joints 40, 41, 42 support the movable frame from the fixed frame. Each support means includes an elevation screw 44 and a slide plate 20, 21 or 22.

Each of the slide plates 20, 21, 22 is notched in a suitable manner so as to slide in the respective slideway of the fixed frame. The slide plates have respective threaded openings 24, 25, 26 each of which is aligned perpendicular to the plane of the fixed frame when the corresponding plate is seated in its associated slideway.

Each elevation screw 44 includes a threaded post 45 having a ball or sphere 46 attached to its lower end and a screwdriver notch 47 formed on its upper end. The threaded post is adapted to engage the threaded opening of a corresponding slide or base plate, and the ball or sphere 46 is of such diameter as to either rotate or slide longitudinally within the interior wall of the tubular frame MF1. The ball 46 is inserted through the corresponding opening 34, 35, or 36.

Reference is now made specifically to FIGS. 2–4, inclusive, illustrating the operation of pivot joint 40 which includes base plate 20. The width of slot 30 (FIG. 3) is considerably greater than the thickness of the lower end of post 45.

The pivot joint of FIGS. 2–4, inclusive, has 6° of freedom, and hence may be adjusted in six different ways, as follows:

1. Elevation adjustment is made by using screwdriver slot 47 to turn threaded post 45 so as to raise or lower the ball 46 along the VE axis relative to base plate 20.
2. The base plate 20 may be moved in the slideway 16 of frame arm 10 to accomplish a transverse horizontal movement (relative to MF1) along the TH axis as indicated in FIG. 4.
3. The tube may slide in longitudinal, horizontal movement along the LH axis relative to the sphere 46.
4. The vertical angle VA of the tube, shown in FIG. 2, may be adjusted by lowering one end of the tube and raising the other end relative to the ball 46.
5. The tube may be twisted in a horizontal plane to vary its horizontal angle HA as shown in FIG. 4.

6. The tube may rotate about its own longitudinal axis relative to the elevation screw, as shown by curved arrow R in FIG. 3.

Although there are six adjustments for each of the three pivot joints, the positioning of movable frame MF1 requires only a total of six positive adjustments to be made. These are preferably accomplished by adjusting the three elevation screws along the VE axis; adjusting the slide plate 20 along its TH axis (the axis 14); adjusting one of the slide plates 21, 22 along its TH axis (the axis 13) while permitting the other to slide freely as required; and rotating the movable frame relative to the fixed frame so that it moves along the LH axis relative to all three of tha balls 46. It therefore follows that adjustment 1 of each pivot joint will always be positively controlled, adjustments 2 and 3 are sometimes positively controlled, and adjustments 4, 5 and 6 are always dependent or slave adjustments.

While the present invention has been described specifically in at least one of its forms, such detailed disclosure has been made only in order to comply with the patent laws and is not intended in any way to limit the concept or scope of the invention, which is more particularly defined in the accompanying claims.

I claim:

1. A pivot joint having four degrees of freedom, comprising:
   an empty tubular member having an empty longitudinally extending slot formed in a wall portion thereof;
   a sphere seated within said tubular member in free axially slidable and rotatable engagement with the interior circumferential wall surface thereof;
   a post having its longitudinal axis substantially aligned with the radius center of said sphere;
   one end of said post extending through said slot and being fixedly attached to said sphere whereby said tubular member may slide in the direction of its own longitudinal axis relative to said sphere and post, may twist about said sphere in a plane perpendicular to the longitudinal axis of said post, and may also twist about said sphere in a plane in which said post lies; and
   the width of said slot being greater than the diameter of said one end of said post whereby said tubular member may also rotate about its own longitudinal axis relative to said sphere and post.

2. A pivot joint having five degrees of freedom, comprising:
   an empty tubular member having an empty longitudinally extending slot formed in a wall portion thereof;
   a sphere seated within said tubular member in free axially slidable and rotatable engagement with the interior circumferential wall surface thereof;
   a post having its longitudinal axis substantially aligned with the radius center of said sphere;
   one end of said post extending through said slot and being fixedly attached to said sphere whereby said tubular member may slide in the direction of its own longitudinal axis relative to said sphere and post, may twist about said sphere in a plane perpendicular to the longitudinal axis of said post, and may also twist about said sphere in a plane in which said post lies;
   the width of said slot being greater than the diameter of said one end of said post whereby said tubular member may also rotate about its own longitudinal axis relative to said sphere and post; and
   a base plate having a threaded opening therein, the other end portion of said post being threaded and being received in said opening, whereby the rotation of said post additionally varies the distance between said plate and said tubular member along the axis of said post.

3. A pivot joint as in claim 2 wherein the extremity of said other end of said post is provided with engageable means for selectively rotating said post relative to said base plate.

4. A pivot joint as in claim 2 which additionally includes a frame member, a track on said frame member, and means mounting said base plate on said track for slidable movement therealong with the longitudinal axis of said post being perpendicular to said track, whereby said tubular member has 6° of freedom relative to said frame member.

* * * * *